United States Patent
Owen et al.

(10) Patent No.: US 10,291,035 B2
(45) Date of Patent: *May 14, 2019

(54) MITIGATING AN EFFECT OF A DOWNSTREAM FAILURE IN AN AUTOMATIC TRANSFER SWITCHING SYSTEM

(71) Applicant: Juniper Networks, Inc., Sunnyvale, CA (US)

(72) Inventors: David K. Owen, Livermore, CA (US); Jaspal S. Gill, Tracy, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 15/641,613

(22) Filed: Jul. 5, 2017

(65) Prior Publication Data

US 2017/0302085 A1    Oct. 19, 2017

Related U.S. Application Data

(63) Continuation of application No. 14/867,595, filed on Sep. 28, 2015, now Pat. No. 9,705,337.

(51) Int. Cl.
| | |
|---|---|
| G06F 1/26 | (2006.01) |
| G06F 1/30 | (2006.01) |
| H02J 3/38 | (2006.01) |
| H02J 4/00 | (2006.01) |
| H02J 5/00 | (2016.01) |
| H02J 9/06 | (2006.01) |
| G06F 1/32 | (2019.01) |
| H02M 1/00 | (2006.01) |

(52) U.S. Cl.
CPC .............. *H02J 5/00* (2013.01); *G06F 1/263* (2013.01); *G06F 1/30* (2013.01); *H02J 3/38* (2013.01); *H02J 4/00* (2013.01); *H02J 9/06* (2013.01); *G06F 1/26* (2013.01); *H02M 2001/0009* (2013.01)

(58) Field of Classification Search
CPC .......... G06F 1/26; G06F 1/3203; G06F 1/263; G06F 1/3287; G06F 1/30; G06F 1/3206
USPC ................... 713/300, 320, 330, 340
See application file for complete search history.

(56) References Cited

U.S. PATENT DOCUMENTS

| | | | |
|---|---|---|---|
| 4,584,555 A | | 4/1986 | Domorazek |
| 4,811,136 A | * | 3/1989 | Jones ........................ G06F 1/30 361/79 |
| 6,601,002 B1 | | 7/2003 | Ennis et al. |
| 9,705,337 B2 | | 7/2017 | Owen et al. |
| 2015/0035358 A1 | | 2/2015 | Linkhart |

OTHER PUBLICATIONS

Partial European Search Report for European Application No. 16155417.5, dated Mar. 9, 2017, 7 pages.

* cited by examiner

*Primary Examiner* — Michael J Brown
(74) *Attorney, Agent, or Firm* — Harrity & Harrity, LLP (57) ABSTRACT

A system may comprise a first switch connected to an output of a first power source, a second switch connected to an output of a second power source, a first sensor connected to an output of the first switch, a second sensor connected to an output of the second switch, a third switch connected to the first sensor and the second sensor and connected to a load, and a control device connected to the first switch, the second switch, the first sensor, the second sensor, and the third switch.

20 Claims, 6 Drawing Sheets

MITIGATING AN EFFECT OF A DOWNSTREAM FAILURE IN AN AUTOMATIC TRANSFER SWITCHING SYSTEM

RELATED APPLICATION

This application is a continuation of U.S. patent application Ser. No. 14/867,595, filed Sep. 28, 2015 (now U.S. Pat. No. 9,705,337), which is incorporated herein by reference.

BACKGROUND

A load (e.g., a network device, a computer, a power supply module, etc.) may receive electrical current from a first power source (e.g., a power supply module, a generator, a power plant, etc.). A second power source may function as a backup for the first power source. In the event that the first power source fails, an automatic transfer switching (ATS) system may switch the load from being powered by the first power source to being powered by the second power source.

SUMMARY

According to some possible implementations, a device may include one or more processors that may detect a failure condition in a system that includes a load and at least two power sources. The load may be configured to be powered by the system. The system may include a switch to selectively power the load using a first electrical current provided by a first power source, of the at least two power sources, or using a second electrical current provided by a second power source of the at least two power sources. The device may determine that the failure condition is associated with a failure at the load. The device may transmit a signal based on determining that the failure condition is associated with the failure at the load. The signal may cause the switch to maintain a state of the switch when the switch receives the signal. The state may be a first state when the switch powers the load using the first electrical current, or the state may be a second state when the switch powers the load using the second electrical current.

According to some possible implementations, a system may comprise a first switch connected to an output of a first power source, a second switch connected to an output of a second power source, a first sensor connected to an output of the first switch, a second sensor connected to an output of the second switch, a third switch connected to the first sensor and the second sensor and connected to a load, and/or a control device connected to the first switch, the second switch, the first sensor, the second sensor, and the third switch.

According to some possible implementations, a method may include detecting a failure condition in a system that includes a load and at least two power sources. The load may include a device to be powered by the system. The system may include a switch that operates in a first state or a second state. The switch, when in the first state, may power the load using a first electrical current provided by a first power source of the at least two power sources. The switch, when in the second state, may power the load using a second electrical current provided by a second power source of the at least two power sources. The switch may be in the first state or the second state. The method may include determining that the failure condition is associated with a failure at the load. The method may include causing the switch to maintain the first state or the second state without switching between the first state and the second state based on determining that the failure condition is associated with a failure at the load.

DETAILED DESCRIPTION

The following detailed description of example implementations refers to the accompanying drawings. The same reference numbers in different drawings may identify the same or similar elements.

An automatic transfer switching (ATS) system, or an alternating current transfer switching system (also referred to herein as an ATS system), may manage a set of power sources (e.g., power supply modules, generators, power plants, etc.) that may provide electrical current to power a load (e.g., a network device, a computer, a power supply module, etc.). The load may be described herein as being "downstream" from the set of power sources, and the set of power sources may be described herein as being "upstream" from the load. When a first power source of the set of power sources fails (e.g., operates outside of a given set of parameters), the ATS system may detect the failure, and may switch the load to be powered by a second power source of the set of power sources. In this way, the ATS improves resilience of the load against power failures.

However, in some cases, a failure may occur at the load. For example, the load may undergo a short circuit, a line cut scenario, or the like. The failure at the load may damage a first upstream power source that powers the load. In such a case, the ATS system may detect the failure, and may automatically switch the load to be powered by a second upstream power source. The second upstream power source, in turn, may be damaged by the failure at the load.

Implementations described herein permit the ATS system to determine that the failure is associated with the load, based on the failure at the load causing a voltage drop and/or an amperage increase, to perform an action to mitigate damage to the upstream power sources, and to prevent failure of the ATS system. In this way, the ATS system improves failure resilience of the ATS system and reduces a likelihood of damage to multiple upstream power sources due to a failure associated with a downstream load.

Figure 1A:
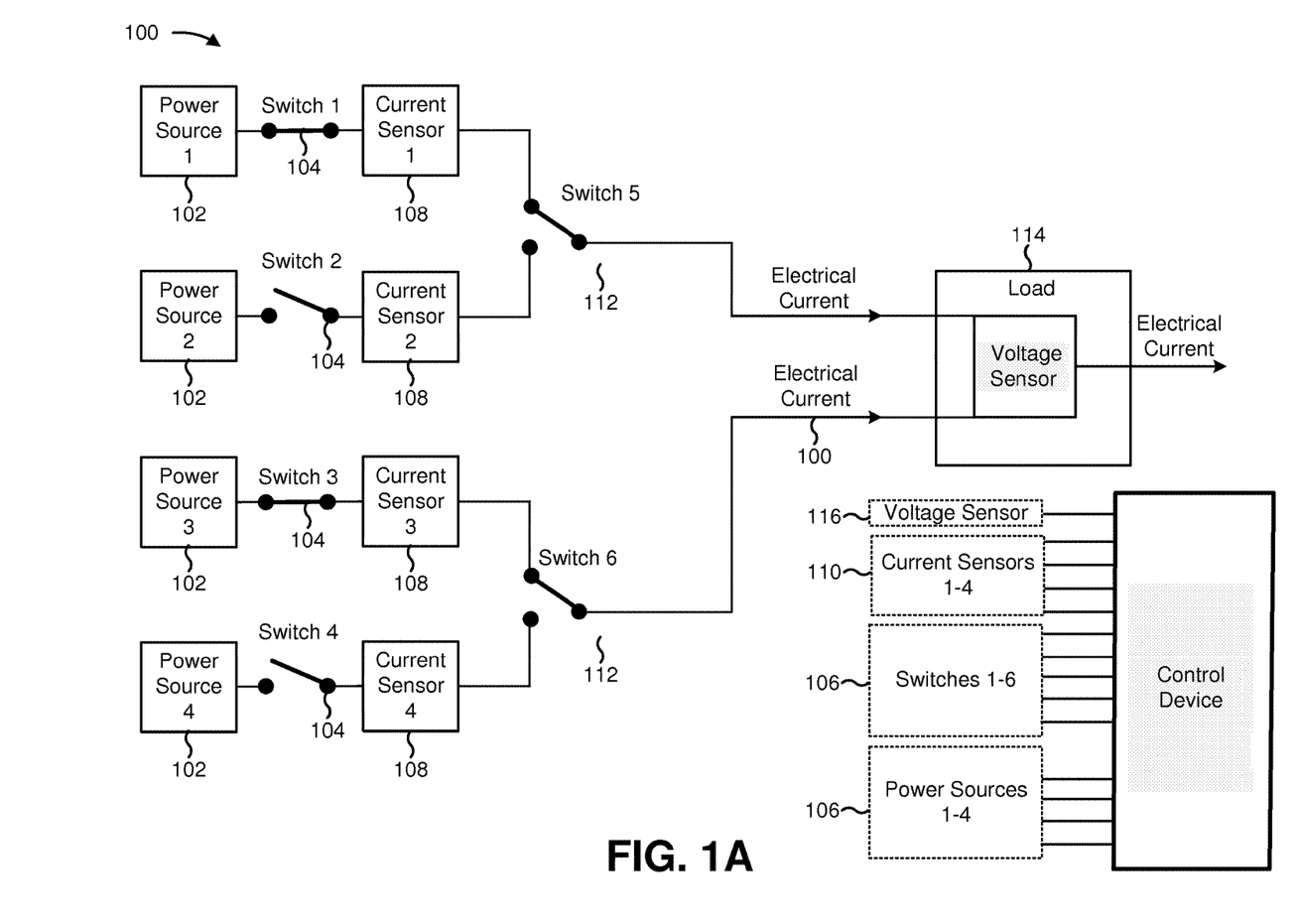
FIGS. 1A-1C are diagrams of an overview of an example implementation described herein.
Figure 1B:
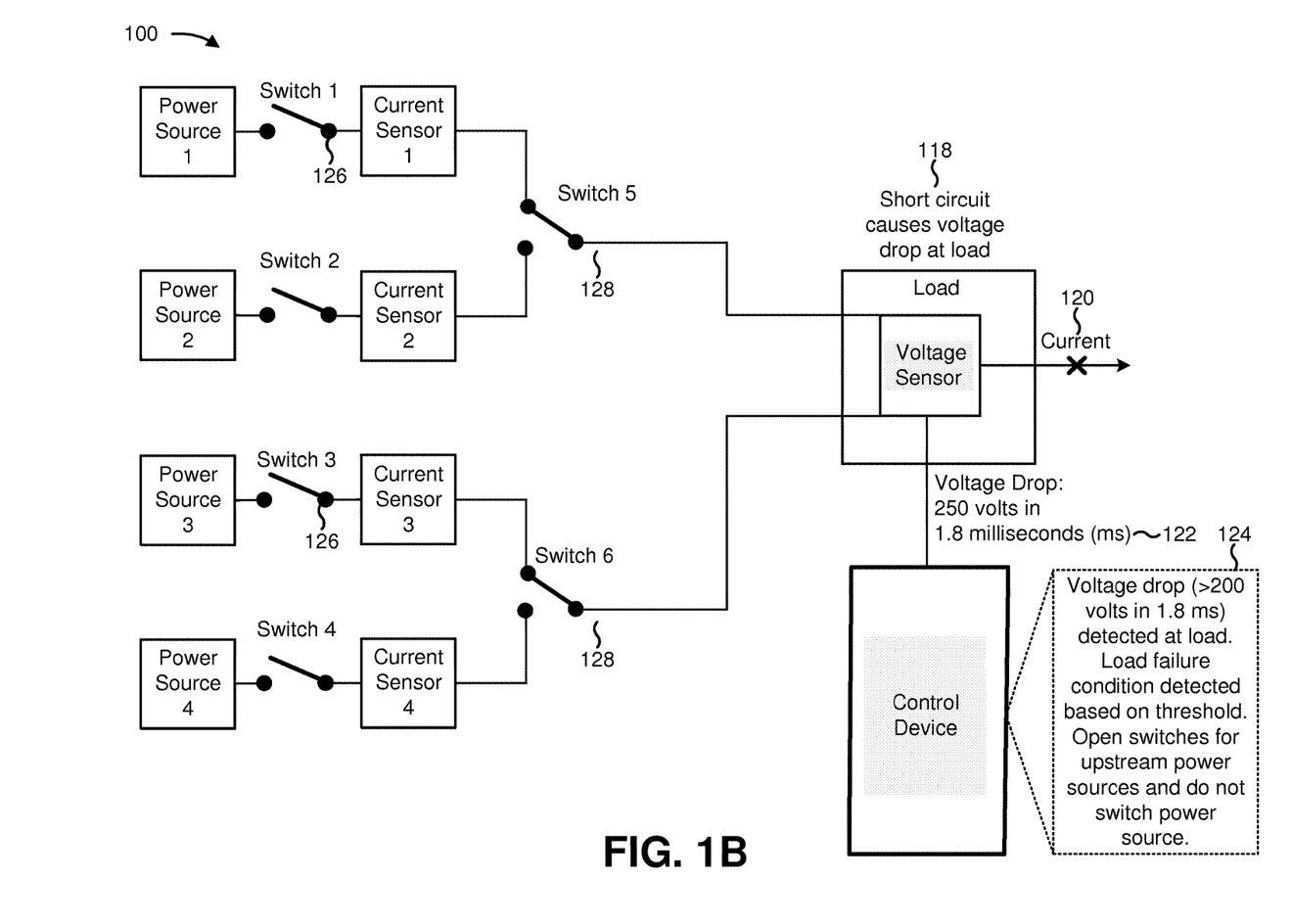
Figure 1C:
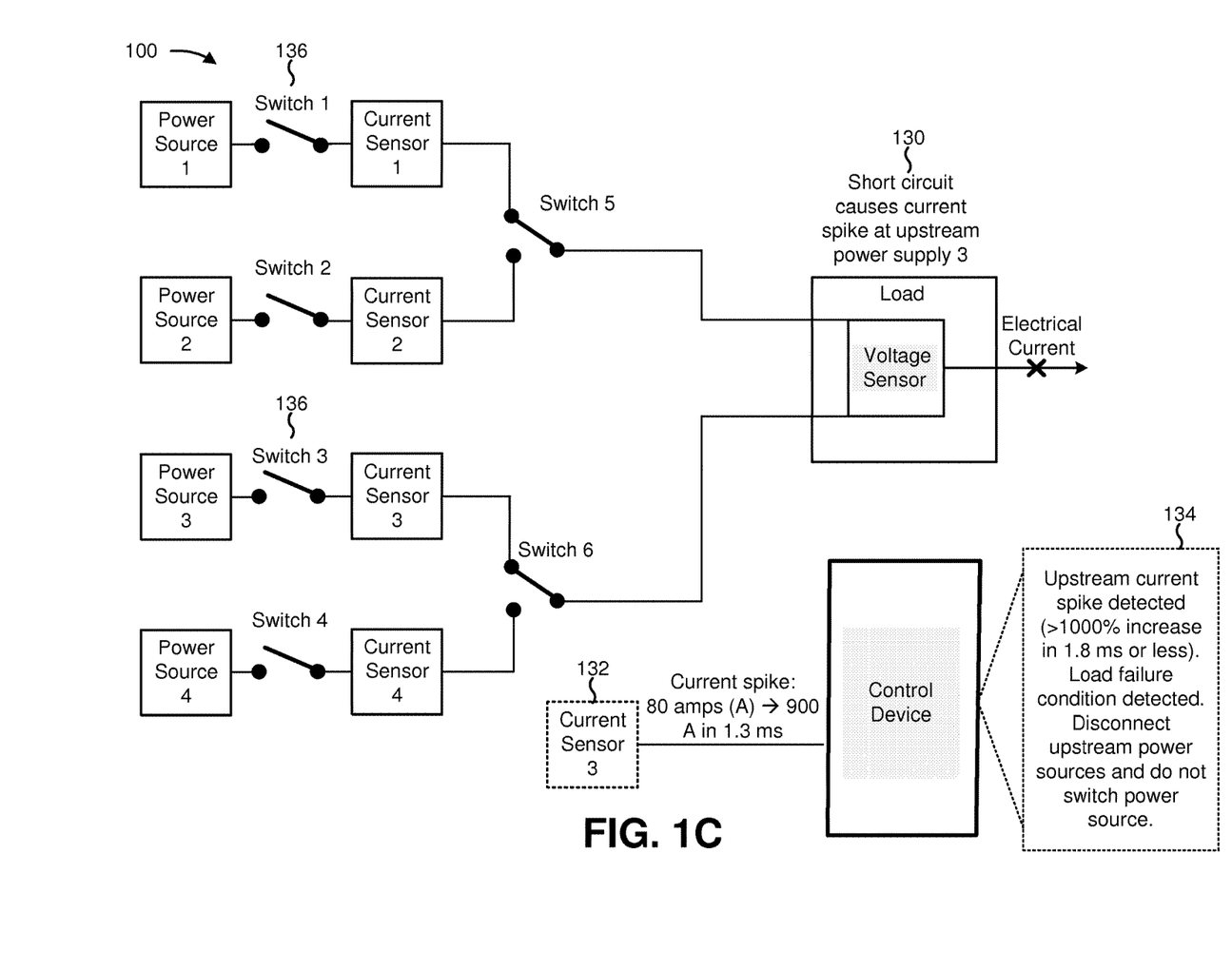

FIGS. 1A-1C are diagrams of an overview of an example implementation 100 described herein. FIGS. 1A-1C show an ATS system to provide power to a load. As shown by reference number 102, the ATS system shown in FIG. 1A includes 4 power sources (e.g., power source 1, power source 2, power source 3, and power source 4). As shown by reference number 104, each power source is connected with a respective switch (e.g., switch 1, switch 2, switch 3, and switch 4, respectively). As further shown, switch 1 and switch 3 are closed (e.g., permitting electrical current to pass), and switch 2 and switch 4 are open (e.g., not permitting electrical current to pass).

As shown by reference number 106, power sources 1-4 and switches 1-4 may communicate with a control device of the ATS system. In some implementations, the control device may control power sources 1-4 and switches 1-4. For example, the control device may open or close switches, may activate power sources, may deactivate power sources, may cause a power source to change a voltage and/or amperage of an electrical current provided by the power source, or the like.

As shown by reference number 108, power sources 1-4 are associated with current sensors (e.g., current sensor 1, current sensor 2, current sensor 3, and current sensor 4). Current sensors 1-4 may detect amperages of electrical currents supplied by power sources 1-4, and may provide information identifying the amperages to the control device, as shown by reference number 110.

As shown by reference number 112, the ATS system may include switch 5 to switch the load between power sources 1 and 2, and switch 6 to switch the load between power sources 3 and 4. As shown by reference number 106, switch 5 and switch 6 may communicate with the control device. In some implementations, the control device may control switches 5-6. When the control device detects a failure of a power source, the control device may use switch 5 and/or switch 6 to switch the downstream load to a different power source. For example, if power source 1 fails, the control device may switch the downstream load to power source 2 by actuating switch 1 (e.g., to open the line from power source 1 to switch 5), switch 2 (e.g., to close the line from power source 2 to switch 5), and/or switch 5 (e.g., to open the line from power source 1 to the load, and to close the line from power source 2 to the load).

Switch 5 and switch 6 may operate in a particular state. For example, when switch 5 is closed with regard to power source 1, switch 5 may be in a first state, and when switch 5 is closed with regard to power source 2, switch 5 may be in a second state. The control device may control the states of switch 5 and switch 6.

As shown by reference number 114, the load for the ATS system may include a voltage sensor. The voltage sensor may measure voltages of the electrical currents provided by power sources 1-4 at the load. As shown by reference number 116, the voltage sensor may provide information to the control device (e.g., information identifying voltages of the electrical currents, information identifying changes in voltages of the electrical currents, etc.). As further shown, the load may output an electrical current that may be generating using power from the electrical currents received from power sources 1-4.

As shown in FIG. 1B, and by reference number 118, a short circuit at the load may cause a voltage drop at the load, which the voltage sensor may sense. As shown by reference number 120, the short circuit may interrupt an electrical current outputted by the load. As shown by reference number 122, the voltage sensor may provide information to the control device indicating that the load has experienced a voltage drop of 250 volts in 1.8 milliseconds (ms). In such a scenario, power source 1 and/or power source 3 may be damaged based on the short circuit at the load. Further, if the ATS system detects the voltage drop as a failure of a power source (and not a failure at the load) and switches the load to be powered by power source 2 and/or power source 4, the ATS system may cause power source 2 and/or power source 4 to be damaged.

As shown by reference number 124, the control device may determine that the voltage drop satisfies a threshold value (e.g., a voltage change of 200 volts, etc.) and occurs within a threshold amount of time (e.g., 1.8 ms). As further shown, based on the voltage drop at the load satisfying the threshold value and/or occurring within the particular period of time, the control device may detect a load failure condition. Here, the load failure condition is caused by the short circuit at the load.

As shown by reference number 126, the control device may cause switches for the upstream power sources to be opened (e.g., switch 1, switch 2, switch 3, and switch 4). As shown by reference number 128, the control device may cause a state of switch 5 and switch 6 to be maintained, to prevent switch 5 and switch 6 from switching the power source for the load from power source 1 to power source 2, and from power source 3 to power source 4, respectively. In some implementations, the control device may open switch 5 and switch 6, to interrupt the electrical currents of power sources 1 and 3, thus preventing damage to power sources 1 and 3. In this way, the control device prevents damage to the upstream power sources caused by a short circuit at the load, which reduces expense associated with maintaining the upstream power sources and improves resilience of the ATS system.

As shown in FIG. 1C, and by reference number 130, in some cases, a short circuit at the load may cause an increase in amperage (e.g., a current spike) at an upstream power source. As shown by reference number 132, current sensor 3, associated with power source 3, provides an amperage measurement to the control device indicating that amperage has increased from 80 amps to 900 amps in 1.3 ms. As shown by reference number 134, the control device may determine that the current spike satisfies a threshold value (e.g., ten times an average load, etc.), and occurs within a threshold amount of time (e.g., 1.8 ms or less, in this case).

As further shown, the control device may determine that the current spike satisfies a load failure condition based on the current spike satisfying the threshold value and occurring within the particular period of time, and may disconnect power sources 1, 2, 3, and 4 by opening switches 1 and 3, as shown by reference number 136. As further shown, the control device may not switch the load from power source 1 to power source 2, and may not switch the load from power source 3 to power source 4 (e.g., may cause switch 5 and switch 6 to maintain their respective states). In this way, the control device prevents damage to the upstream power sources based on detecting a failure at the load, which reduces expense associated with repairing the upstream power sources and improves resilience of the ATS system.

Figure 2:
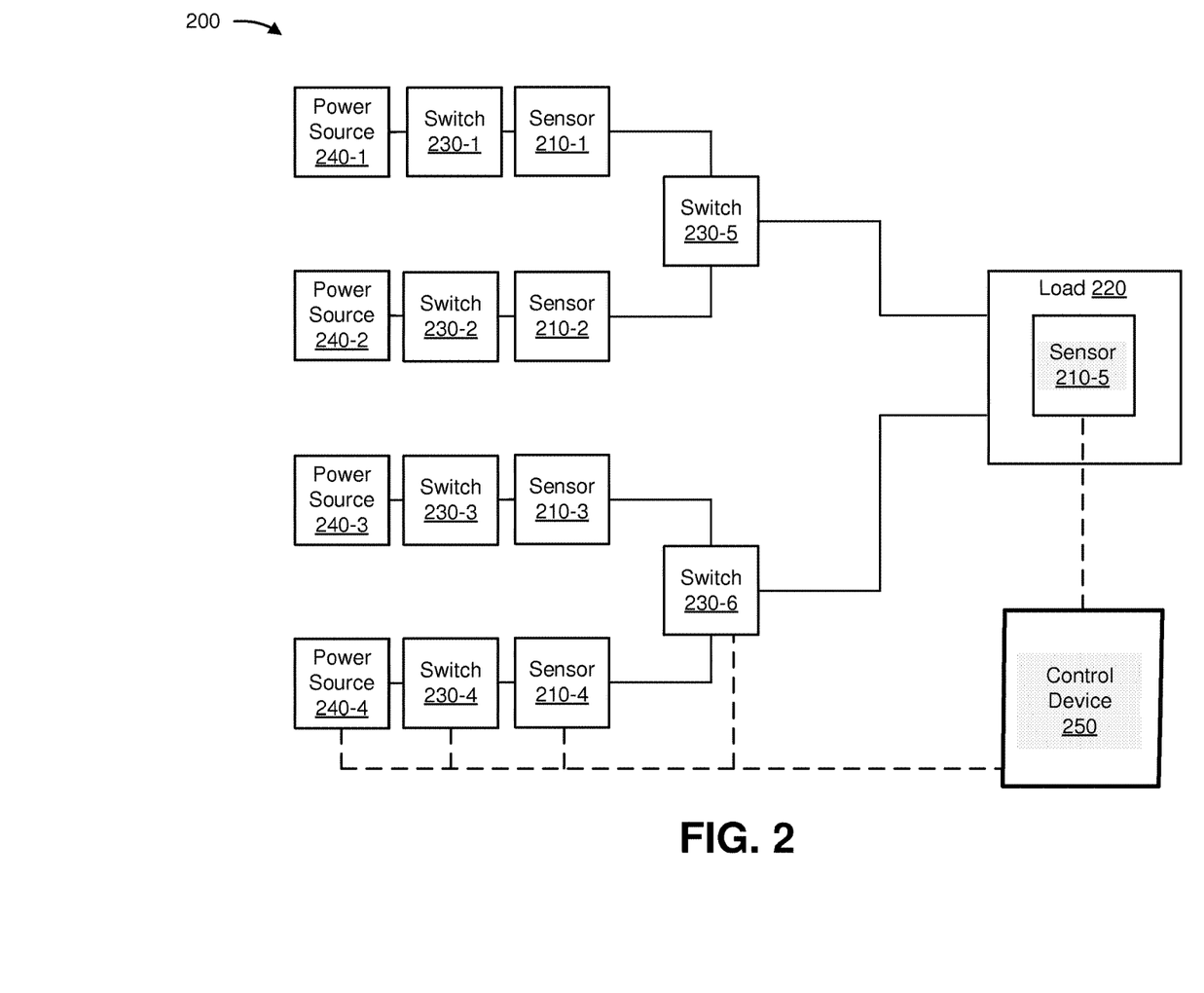
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more sensors 210-1 through 210-M (M≥1) (hereinafter referred to collectively as "sensors 210," and individually as "sensor 210"), a load 220, one or more switches 230-1 through 230-N (N≥1) (hereinafter referred to collectively as "switches 230," and individually as "switch 230"), one or more power sources 240-1 through 240-P (P≥1) (hereinafter referred to collectively as "power sources 240," and individually as "power source 240"), and a control device 250. Devices of environment 200 may interconnect via wired connections, wireless connections, or a combination of wired and wireless connections. FIG. 2 shows five sensors 210, six switches 230, and four power sources 240. However, in some implementations, environment 200 may include a different quantity and/or arrangement of sensors 210, loads 220, switches 230, and/or power sources 240. For the purpose of FIG. 2, types of devices of environment 200 that may communicate are connected by a dashed line. For example, a dashed line between sensor 210-4 and control device 250 indicates that control device 250 is capable of communicating with sensors 210-1, 210-2, 210-3, 210-4, and 210-5.

Sensor 210 may include a device capable of detecting a voltage value and/or an amperage value of an electrical current. For example, sensor 210 may include a current sensor, a voltage sensor, an impedance sensor, or the like. In some implementations, sensor 210 may be associated with (e.g., included in, placed downstream from, etc.) power source 240. Additionally, or alternatively, sensor 210 may be associated with (e.g., included in, placed downstream from, etc.) load 220. In some implementations, sensor 210 may receive information from and/or transmit information to another device of environment 200.

Load 220 may include a device that receives power from power source 240. For example, load 220 may include a user device (e.g., a desktop computer, a laptop computer, a mobile device, a gaming device, etc.), a network device (e.g., a router, a gateway, a firewall, a server, an access point, etc.), a bulk capacitor, an appliance, a vehicle, a piece of industrial equipment, a power supply module, or another type of device. In some implementations, load 220 may receive information from and/or transmit information to another device of environment 200.

Switch 230 may include a device capable of interrupting an electrical current and/or diverting an electrical current from a first line to a second line. For example, switch 230 may include a relay (e.g., a mechanical relay, a solid-state relay, etc.), a circuit breaker, a fuse, a power transistor, a silicon-controlled rectifier, a bi-directional switch, a triode for alternating current, or the like. In some implementations, switch 230 may receive information from and/or transmit information to another device of environment 200.

Power source 240 may include a device capable of providing electrical current. For example, power source 240 may include an alternating current (AC) power supply module, a direct current (DC) power supply module, a power plant, a generator, or the like. In some implementations, power source 240 may include one or more sensors 210 and/or switches 230. In some implementations, power source 240 may receive information from and/or transmit information to another device of environment 200.

Control device 250 may include a device capable of receiving, generating, storing, processing, and/or providing information. For example, control device 250 may include an integrated circuit, an application-specific integrated circuit, a processor, a control circuit, a field programmable gate array (FPGA), or another type of device that is capable of controlling operation of switches 230. In some implementations, control device 250 may receive information from and/or transmit information to another device of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
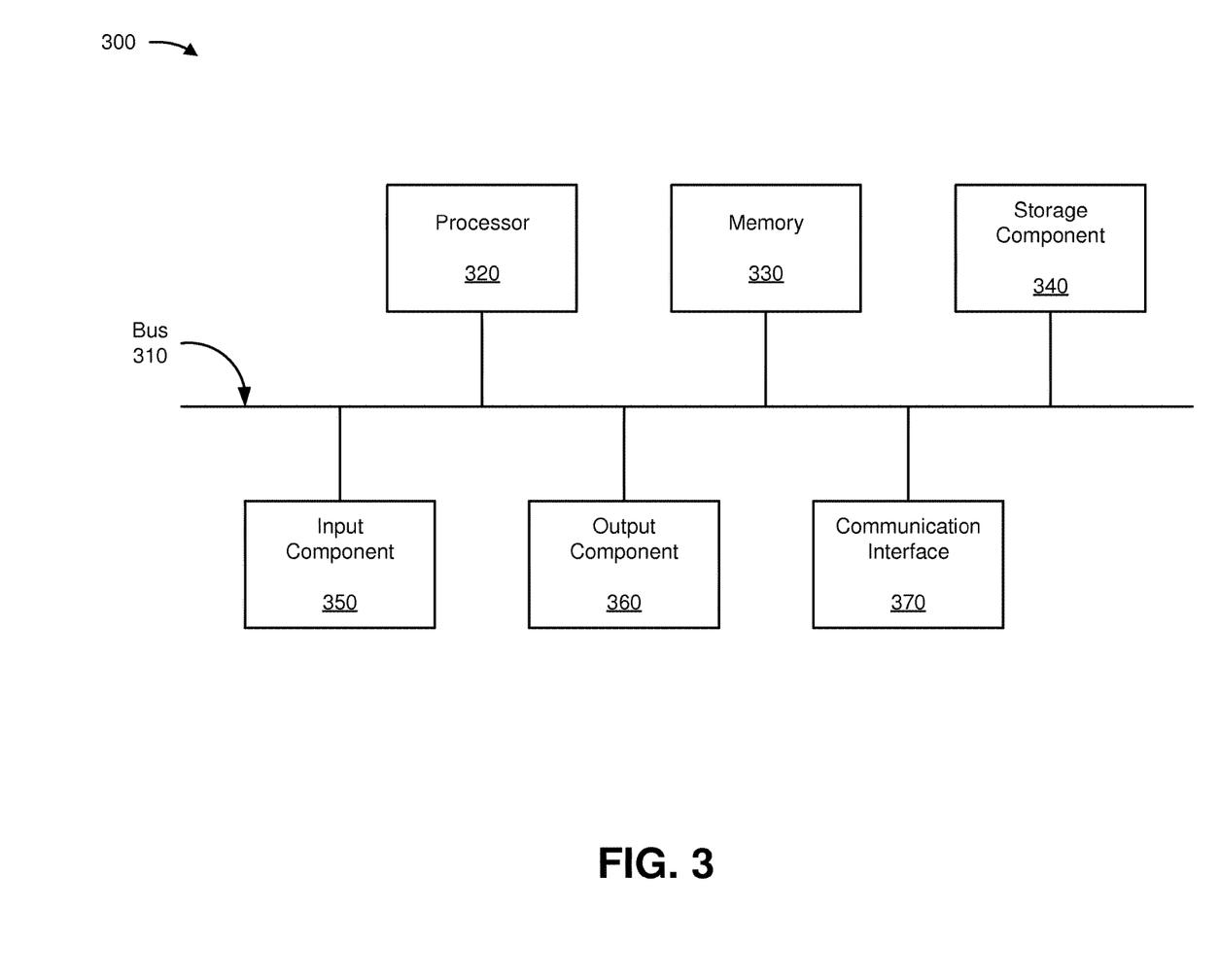
FIG. 3 is a diagram of example components of one or more devices of FIG. 2.

FIG. 3 is a diagram of example components of a device 300. Device 300 may correspond to sensor 210, load 220, switch 230, power source 240, and/or control device 250. In some implementations, sensor 210, load 220, switch 230, power source 240, and/or control device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
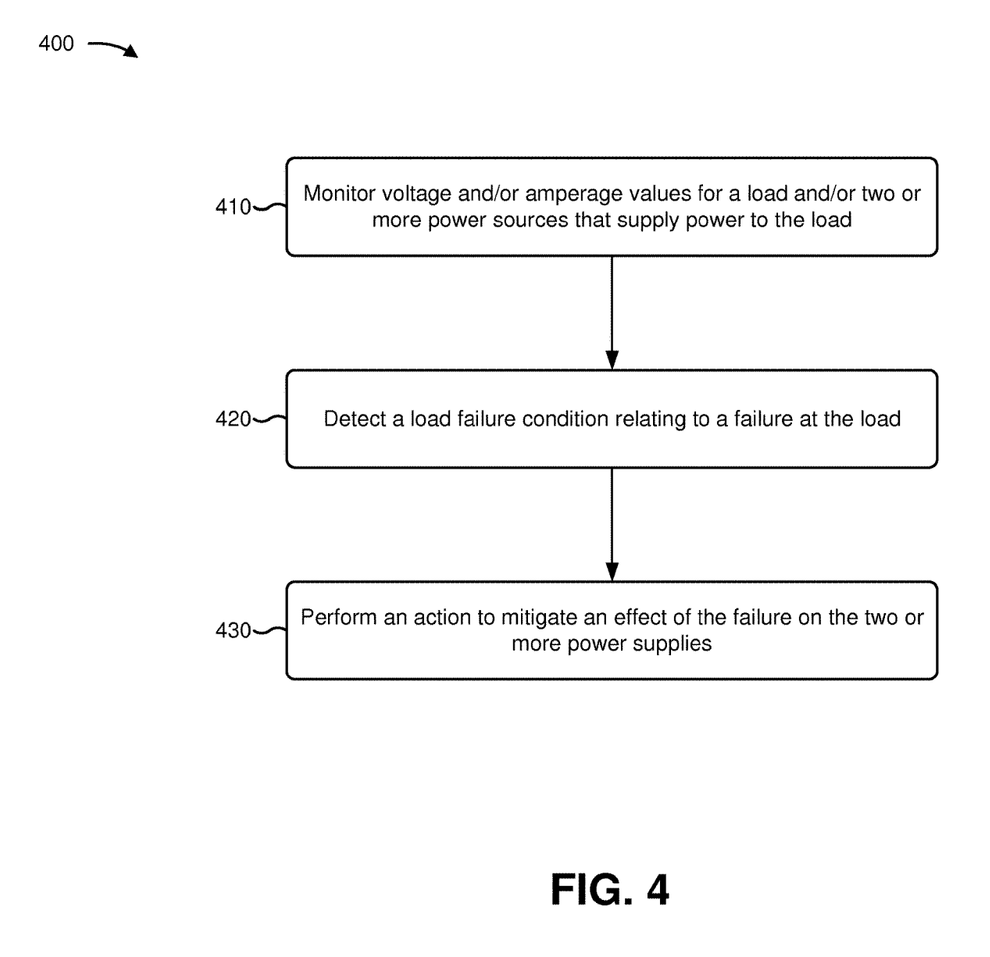
FIG. 4 is a flow chart of an example process for mitigating an effect of a downstream load failure.

FIG. 4 is a flow chart of an example process 400 for mitigating an effect of a downstream load failure. In some implementations, one or more process blocks of FIG. 4 may be performed by control device 250. In some implementations, one or more process blocks of FIG. 4 may be performed by another device or a group of devices separate from or including control device 250, such as sensor 210, load 220, switch 230, and/or power source 240.

As shown in FIG. 4, process 400 may include monitoring voltage values and/or amperage values for a load and/or two or more power sources that supply power to the load (block 410). For example, control device 250 may monitor voltage values and/or amperage values relating to load 220 and/or one or more power sources 240. Control device 250 may monitor the voltage values and/or amperage values based on measurements from sensors 210. For example, sensors 210 may detect the voltage values and/or amperage values (e.g., at load 220, at power source 240, downstream from power source 240 and upstream from load 220, etc.), and may provide the voltage values and/or amperage values to control device 250. In some implementations, control device 250 may process the voltage values and/or amperage values. For example, control device 250 may determine a moving average of a voltage value and/or an amperage value, a peak voltage value and/or amperage value, a weighted average of a voltage value and/or amperage value, a minimum voltage value and/or amperage value, a root mean square of a voltage value and/or an amperage value, an occurrence of a spike in voltage values and/or amperage values, or the like.

In some implementations, control device 250 may determine whether an electrical current is routed via a particular path based on the voltage values and/or amperage values. For example, control device 250 may cause an electrical current to be routed via a particular path via operation of switches 230. Control device 250 may obtain information from sensors 210 that are located along the particular path, and may determine whether the electrical current is routed along the particular path. For example, if the information indicates that no electrical current is present on the particular path, control device 250 may cause the electrical current to be rerouted, may cause a worker to be dispatched to the ATS system to determine why no electrical current is present on the particular path, or the like.

As further shown in FIG. 4, process 400 may include detecting a load failure condition relating to the load (block 420). For example, control device 250 may detect a load failure condition relating to load 220. A load failure condition may be associated with a failure at load 220, such as a short circuit of load 220, a malfunction of load 220, a failure of load 220 to perform at an expected level, or the like. Control device 250 may detect the load failure condition based on voltage values and/or amperage values associated with load 220. For example, control device 250 may detect the load failure condition based on a voltage value and/or an amperage value obtained by a sensor 210 that is downstream from power source 240, based on a voltage value and/or an amperage value obtained by sensor 210 that is included in load 220, or the like.

In some implementations, control device 250 may detect a load failure condition based on an amperage value. For example, control device 250 may detect a load failure condition based on an amperage satisfying a threshold amperage value (e.g., a maximum allowable amperage value, such as 1000% of an expected amperage value, or the like). In this way, control device 250 may determine a load failure condition based on a maximum amperage value, which permits control device 250 to prevent damage to power sources 240 that may be caused by a peak amperage, which reduces expenses associated with maintaining power sources 240.

As another example, control device 250 may detect a load failure condition based on an amperage value satisfying a threshold for a threshold amount of time (e.g., 1000% of an expected amperage value for a period of at least 2 ms, 200% of an expected amperage value for a period of at least 50 ms, etc.). In this way, control device 250 may determine a load failure condition based on an amperage value that is sustained over time, which permits control device 250 to prevent damage to power sources 240 that may be caused by a sustained amperage, and reduces expenses associated with maintaining power sources 240.

As another example, control device 250 may detect a load failure condition based on a change in amperage (e.g., a change from a first amperage value to a second amperage value, a change from a first amperage value to a second amperage value in a threshold amount of time, a percent change in an amperage value, etc.). By detecting the load failure condition based on the change in amperage, control device 250 prevents damage to power sources 240 based on rapid changes in amperage supplied to load 220, which reduces expenses associated with maintaining power sources 240.

In some implementations, control device 250 may detect a load failure condition based on a voltage value. For example, control device 250 may detect a load failure condition based on a voltage satisfying a threshold voltage value (e.g., a minimum voltage value, such as 80 volts, 25% of an expected voltage value, or the like). In this way, control device 250 may determine a load failure condition based on a sudden drop in voltage at load 220, which permits control device 250 to prevent damage to power sources 240 that may be caused by a peak voltage, and reduces expenses associated with maintaining power sources 240.

As another example, control device 250 may detect a load failure condition based on a voltage value satisfying a threshold for a threshold amount of time (e.g., 25% of an expected voltage value for a period of at least 2 ms, less than or equal to 50 volts for a period of 50 ms, etc.). In this way, control device 250 may determine a load failure condition based on a voltage value that is sustained over time, which permits control device 250 to prevent damage to power sources 240 that may be caused by a sustained voltage drop, and reduces expenses associated with maintaining power sources 240.

As another example, control device 250 may detect a load failure condition based on a change in voltage (e.g., a change from a first voltage value to a second voltage value, a change from a first voltage value to a second voltage value in a threshold amount of time, a percent change in a voltage value, etc.). By detecting the load failure condition based on the change in voltage, control device 250 prevents damage to power sources 240 based on rapid changes in voltage at load 220, which reduces expenses associated with maintaining power sources 240.

In some implementations, control device 250 may detect a load failure condition based on a combination of a voltage value and an amperage value. For example, in some cases, a voltage value and an amperage value for load 220 may change at different times (e.g., the amperage value may increase before the voltage value decreases, the voltage value may decrease before the amperage value increases, etc.). In such cases, control device 250 may detect the change in the voltage value and the change in the amperage value, and may detect a load failure condition accordingly. Additionally, or alternatively, control device 250 may detect a first change in one value (e.g., a voltage value or an amperage value), and may begin monitoring for a subsequent change in the other value (e.g., an amperage value or a voltage value). In this way, control device 250 monitors load 220 for failures based on amperage values and voltage values, which increases likelihood of detecting a load failure condition and, thus, saves time and money used for maintaining power sources 240.

In some implementations, control device 250 may determine a threshold for a load failure condition. For example, control device 250 may obtain voltage values and/or amperage values for the ATS system, and may determine expected voltage values and/or amperage values based on the obtained voltage values and/or amperage values. Control device 250 may determine thresholds for the voltage values and/or amperage values based on the expected voltage values and/or amperage values.

For example, control device 250 may determine to detect a load failure condition based on a threshold amperage value and a threshold amount of time (e.g., when an amperage value of an electrical current associated with switch 230 increases to more than 1000% of an expected amperage value in less than 1.8 milliseconds, in less than 100 microseconds, etc.). As another example control device 250 may determine to detect a load failure condition when a voltage value associated with load 220 decreases to satisfy a threshold value (e.g., decreases to 80 volts, decreases by 250 volts in a particular period of time, etc.).

As further shown in FIG. 4, process 400 may include performing an action to mitigate an effect of the failure on the two or more upstream power sources (block 430). For example, control device 250 may perform an action to mitigate an effect of the failure on power sources 240. In some implementations, control device 250 may transmit a signal to another device, to cause the other device to perform an action. For example, control device 250 may transmit a failure message to power source 240 to cause power source 240 to stop providing an electrical current to load 220 or to cause power source 240 to modify the electrical current, may provide a failure message to a user device for the user device to provide to a user, or the like.

In some implementations, control device 250 may cause switch 230 to perform an action. For example, control device 250 may cause switch 230 to interrupt an electrical current, may cause switch 230 to maintain a state of switch 230 (e.g., not to switch load 220 from a first power source 240 to a second power source 240), or the like. In this way, control device 250 mitigates an effect of a downstream failure (e.g., a short circuit) at load 220 on power sources 240, which improves resilience of the system and reduces expense associated with repairing the power sources 240.

In some implementations, control device 250 may cause all switches 230 to interrupt the respective electrical currents with which they are connected. Additionally, or alternatively, control device 250 may cause a subset of the switches 230 to open (e.g., switches 1 and 3 in FIGS. 1A-1C), and other switches 230 to maintain a current open/closed state (e.g., switches 5 and 6 in FIGS. 1A-1C). Additionally, or alternatively, control device 250 may re-route power based on the load failure condition. For example, control device 250 may actuate one or more switches 230 to power load 220 from a different power source 240 based on the load failure condition (e.g., a cheaper power source 240, a more resilient power source 240, etc.). In this way, control device 250 mitigates an effect of a downstream failure (e.g., a short circuit) at load 220 on power sources 240, which improves resilience of the system and reduces expense associated with repairing the power sources 240.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, an ATS system improves failure resilience of the ATS system and reduces a likelihood of damage to multiple upstream power sources due to a failure associated with a downstream load.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors to:
  detect a failure condition at a load of a system that includes a sensor associated with the load, a first power source, a second power source, and at least one switch,
    the at least one switch to selectively power the load using the first power source or the second power source,
    the load being powered by a current provided by the first power source, and
    the failure condition being detected based on information provided by the sensor; and
  perform, based on detecting the failure condition, an action to mitigate an effect of the failure condition on the first power source and the second power source.

2. The device of claim 1, where the one or more processors, when detecting the failure condition, are to:
  detect the failure condition based on at least one of a voltage value associated with the load or an amperage value associated with the load.

3. The device of claim 1, where the one or more processors, when detecting the failure condition, are to:
  detect the failure condition based on an amperage value, associated with the load, satisfying a threshold for a threshold amount of time.

4. The device of claim 1, where the one or more processors, when detecting the failure condition, are to:
  detect the failure condition based on a change in an amperage value associated with the load.

5. The device of claim 1, where the one or more processors, when detecting the failure condition, are to:
  detect the failure condition based on a voltage value associated with the load satisfying a threshold for a threshold amount of time.

6. The device of claim 1, where the one or more processors, when detecting the failure condition, are to:
  detect the failure condition based on a change in a voltage value associated with the load.

7. The device of claim 1, where the one or more processors are further to:
  detect a change in a voltage value associated with the load; and
  monitor for a change in an amperage value associated with the load based on detecting the change the voltage value; and
  where the one or more processors, when detecting the failure condition, are to:
    detect the failure condition based on the change in the amperage value.

8. A method, comprising:
  detecting, by a device, a failure condition at a load of a system that includes a sensor associated with the load, a first power source, a second power source, and at least one switch,
    the at least one switch to selectively power the load using the first power source or the second power source,
    the load being powered by a current provided by the first power source, an
    the failure condition being detected based on information provided by the sensor; and
  performing, by the device and based on detecting the failure condition, an action to mitigate an effect of the failure condition on the first power source and the second power source.

9. The method of claim 8, further comprising:
  detecting a change in an amperage value associated with the load; and
  monitoring for a change in a voltage value associated with the load based on detecting the change the amperage value; and
  where detecting the failure condition comprises:
    detecting the failure condition based on the change in the voltage value.

10. The method of claim 8, further comprising:
  obtaining a voltage value associated with the load;
  determining an expected voltage value based on obtaining the voltage value; and
  determining a threshold voltage value based on determining the expected voltage value.

11. The method of claim 8, further comprising:
  obtaining an amperage value associated with the load;
  determining an expected amperage value based on obtaining the amperage value; and
  determining a threshold amperage value based on determining the expected amperage value.

12. The method of claim 8, where performing the action comprises:
  transmitting a message to the first power source to cause the first power source to stop providing an electrical current to the load.

13. The method of claim 8, where performing the action comprises:
  causing the at least one switch to interrupt an electrical current.

14. The method of claim 8, where performing the action comprises:
  causing the at least one switch to maintain a state of the at least one switch.

15. A non-transitory computer-readable medium storing instructions, the instructions comprising:
  one or more instructions that, when executed by one or more processors, cause the one or more processors to:
    detect a failure condition at a load of a system based on information provided by a sensor,
      the load being powered selectively by a first current by a first power source or a second current by a second power source via at least one switch, and
    perform, based on detecting the failure condition, an action to mitigate an effect of the failure condition on the first power source and the second power source.

16. The non-transitory computer-readable medium of claim 15, where the one or more instructions, that cause the one or more processors to perform the action, cause the one or more processors to:

cause all of the at least one switch to interrupt a respective electrical current.

17. The non-transitory computer-readable medium of claim 15, where the at least one switch includes a plurality of switches, and where the one or more instructions, that cause the one or more processors to perform the action, cause the one or more processors to:

cause a first subset of the plurality of switches to open; and cause a second subset of the plurality of switches to maintain their respective states.

18. The non-transitory computer-readable medium of claim 15, where the one or more instructions, that cause the one or more processors to perform the action, cause the one or more processors to:

actuate the at least one switch to power the load from a different power source.

19. The non-transitory computer-readable medium of claim 15, where the one or more instructions, that cause the one or more processors to perform the action, cause the one or more processors to:

transmit a signal to another device to cause the other device to perform a mitigating action.

20. The non-transitory computer-readable medium of claim 15, where the one or more instructions, that cause the one or more processors to detect the failure condition, cause the one or more processors to:

detect the failure condition when a voltage value associated with the load decreases to a value that satisfies a threshold value.

* * * * *